United States Patent
Erben

(10) Patent No.: US 6,168,114 B1
(45) Date of Patent: Jan. 2, 2001

(54) AIRCRAFT DOOR ASSEMBLY

(75) Inventor: Hannes Erben, Donauwoerth (DE)

(73) Assignee: Eurocopter Deutschland GmbH, Munich (DE)

( * ) Notice: Under 35 U.S.C. 154(b), the term of this patent shall be extended for 0 days.

(21) Appl. No.: 09/148,151

(22) Filed: Sep. 3, 1998

(30) Foreign Application Priority Data

Sep. 3, 1997 (DE) .............................................. 197 38 402

(51) Int. Cl.$^7$ ....................................................... B64C 1/14
(52) U.S. Cl. ........................... 244/129.5; 49/227; 49/149; 49/153
(58) Field of Search ............................ 244/129.5, 129.4, 244/119; 49/208, 227, 149, 153

(56) References Cited

U.S. PATENT DOCUMENTS

| | | | |
|---|---|---|---|
| 4,720,065 | * 1/1988 | Hamatani ........................... | 244/129.5 |
| 5,251,851 | 10/1993 | Herrmann et al. ................. | 244/129.5 |
| 5,305,969 | * 4/1994 | Odell et al. ........................ | 244/129.5 |
| 5,316,241 | * 5/1994 | Kallies et al. ..................... | 244/129.5 |
| 5,337,977 | * 8/1994 | Fleming et al. ................... | 244/129.5 |
| 5,577,781 | * 11/1996 | Kallies et al. ..................... | 244/129.5 |
| 5,636,814 | * 6/1997 | Rollert .............................. | 244/129.5 |
| 5,667,169 | * 9/1997 | Erben et al. ...................... | 244/129.5 |
| 5,823,473 | * 10/1998 | Odell et al. ........................ | 244/129.5 |
| 5,931,415 | * 8/1999 | Lingard et al. .................... | 244/129.5 |

FOREIGN PATENT DOCUMENTS

0677483A1  10/1995  (EP) .

* cited by examiner

Primary Examiner—J. Woodrow Eldred
(74) Attorney, Agent, or Firm—Evenson, McKeown, Edwards & Lenahan, P.L.L.C.

(57) ABSTRACT

In a door system for a passenger aircraft, a door panel is mounted on an aircraft structure so that it can pivot around at least one pivot axis and the door panel is movably guided at the end of the inward pivoting movement on a lifting movement path that runs essentially in conformance with the aircraft outside contour and runs transversely to the pivoting direction. Interengaging elements on the door frame and door panel are engaged in the completely closed position, moved out of shapewise engagement in an opposite lifting direction at the beginning of the opening process. The lifting movement takes place in a manner which is favorable for installation and is not prone to problems, while retaining an essentially horizontal pivoting movement path relative to the aircraft structure in such fashion that the pivot axis of the door panel is supported on the door frame with tilting position control and at the end of opening lifting movement, moves into essentially vertical alignment relative to the door frame. A door panel locking system is provided which is operated in the closed position of the door panel and, in a non-liftable manner, locks the door panel to the door frame independently of the swivelling and carrying device and of the tilting position control.

6 Claims, 4 Drawing Sheets

AIRCRAFT DOOR ASSEMBLY

BACKGROUND AND SUMMARY OF THE INVENTION

This application relates to German application 197 38 402.1, filed Sep. 3, 1997 in Germany (the priority of which is being claimed), and German application 197 02 083, filed Jan. 22, 1997 in Germany, the disclosures of which are expressly incorporated by reference herein.

The present invention relates to a so-called "plug" type door system with a door panel supported for sequential movement between a door closed position with shapewise interengagement of door frame and door panel structure holding the door panel against lateral opening movements, a door intermediate position with release of the shapewise interengagement, and a door open position with the door panel pivoted and moved to a position conforming to an outside contour of the aircraft body adjacent the door frame.

In the door system of this type known from U.S. Pat. No. 5,163,639, separate electric motors are provided, located one above the other and under program control, for the individual door functions, in other words raising and lowering, pivoting inward and outward, and shapewise locking of the door panel in the completely closed position. This door system has a limited functional reliability, because if only one of the electric motors or the program control fails, the entire door system will malfunction.

For safety reasons, door systems of the type recited at the outset are therefore at least exclusively operated by corresponding control rods manually or, as is known from DE 44 13 307 A1, by using at least one electric motor drive, which assumes the lifting movement of the door panel while the other door functions and especially the pivoting of the door panel into the open and closed positions must still be performed manually with relatively high force exerted.

An improved door system contemplated by the invention provides for problem free lifting movement of the door from the closed position to the intermediate position, followed by an essentially horizontal door panel movement to the open position in a pivoting phase.

In the door system according to preferred embodiments of the invention, both the lifting and the pivoting functions are assumed by a single motor drive, so that firstly the operating comfort is significantly increased over manual actuation and secondly the risk of a malfunction as well as the size and weight by comparison with a solution with a plurality of separate drives are reduced to a significant degree.

In especially preferred embodiments of the invention, a lifting device, for installation reasons, is located between the supporting device and the door frame.

In order to protect the door panel against improper activation of the drive as it pivots open into the raised lifting position, the drive is advantageously locked when the door panel is pivoted open to prevent switching to the lifting device.

Likewise for safety reasons, the drive can be controlled mechanically.

According to certain preferred embodiments, automatic control with a simultaneously structurally simple design of the drive is achieved in an especially preferred manner by the fact that the drive has two drive elements that are mutually coupled, and is constantly connected drivewise with the supporting device and with the lifting device, with the drive element connected with the supporting device being automatically locked during the lifting movement of the door panel and released at the end of the opening lift, while the drive element connected with the lifting device is automatically locked in the pivoting phase of the door panel and is released at the end of the inward pivoting movement.

In especially preferred embodiments of the invention, the drive has a spindle drive on the lifting device side which is incorporated into the lifting kinematics as a guide member and as a result further decreases the cost of construction and reduces the weight.

An alternative embodiment of the combined lifting and pivoting drive that is especially sturdy in design, in which the lifting kinematics can also consist of nonlinear guide members that are largely curved in any fashion, approximately in the shape of bent guide rails, is achieved by virtue of the fact that the drive has a correspondingly curved rack-and-pinion drive on the lifting device side that matches the shape of the guide members.

For safety reasons, the guide preferably consists of a main drive and an emergency drive that supports the latter in the event of a malfunction or replaces it, advantageously with its own power supply, by which emergency drive the door panel can be moved at least once out of the fully closed position into the completely open position by pivoting.

The drive can be designed hydraulically or pneumatically or, as is done according to certain embodiments for the sake of simplicity, preferably, with an electric motor.

In the door systems according to the invention as generally described above, the lifting and pivoting drive which is commonly associated with a lifting and supporting device, is designed to be self-locking in order to prevent the door panel from migrating under the influence of vibrations or impacts out of the fully lowered lifting position and thereby possibly coming loose from the shapewise engagement with the receiving elements that are integral with the door frame. A lift protection of this kind requires a relatively expensive mechanical coupling that is low in play and elasticity between the door panel and the lifting and pivoting drive with interposition of the lifting and supporting device.

On the other hand, the door panel in the door system of the type claimed according to the invention is secured by a lift lock that is actuated in the fully closed position of the door panel and secures the panel independently of the lifting and/or supporting device as well as the lifting and pivoting drive on the door frame.

As a result of the direct locking of the door panel to the door frame to prevent the panel from being lifted, instabilities caused by movement play or elasticity in the lifting and pivoting drive as well as in the lifting and supporting device continue to have no influence on the functional reliability of the lift lock.

In an especially preferred embodiment of the invention, the lift lock consists of a locking shaft that extends at the level of the locking actuation transversely over the entire width of the door panel, and is mounted rotatably on the door panel, with locking elements on both sides, each fastened to one end of the shaft, and in the actuating position of the lift lock rotated to engage matching counterelements integral with the door frame, whereby a structurally very simple weight-saving design of the lift lock is obtained with a minimum number of individual parts.

The actuation of the lift lock advantageously includes at least one manual lever that is accessible from the inside of the door panel. Preferably the lift lock can be operated manually independently from both door panel sides, and for this purpose the door panel is provided with a manual lever on the inside of the door panel and a manual lever on the outside of the door panel and both manual levers are uncoupled mechanically from one another and connected jointly to the locking shaft.

Other objects, advantages and novel features of the present invention will become apparent from the following detailed description of the invention when considered in conjunction with the accompanying drawings.

DETAILED DESCRIPTION OF THE DRAWINGS

Figure 1:
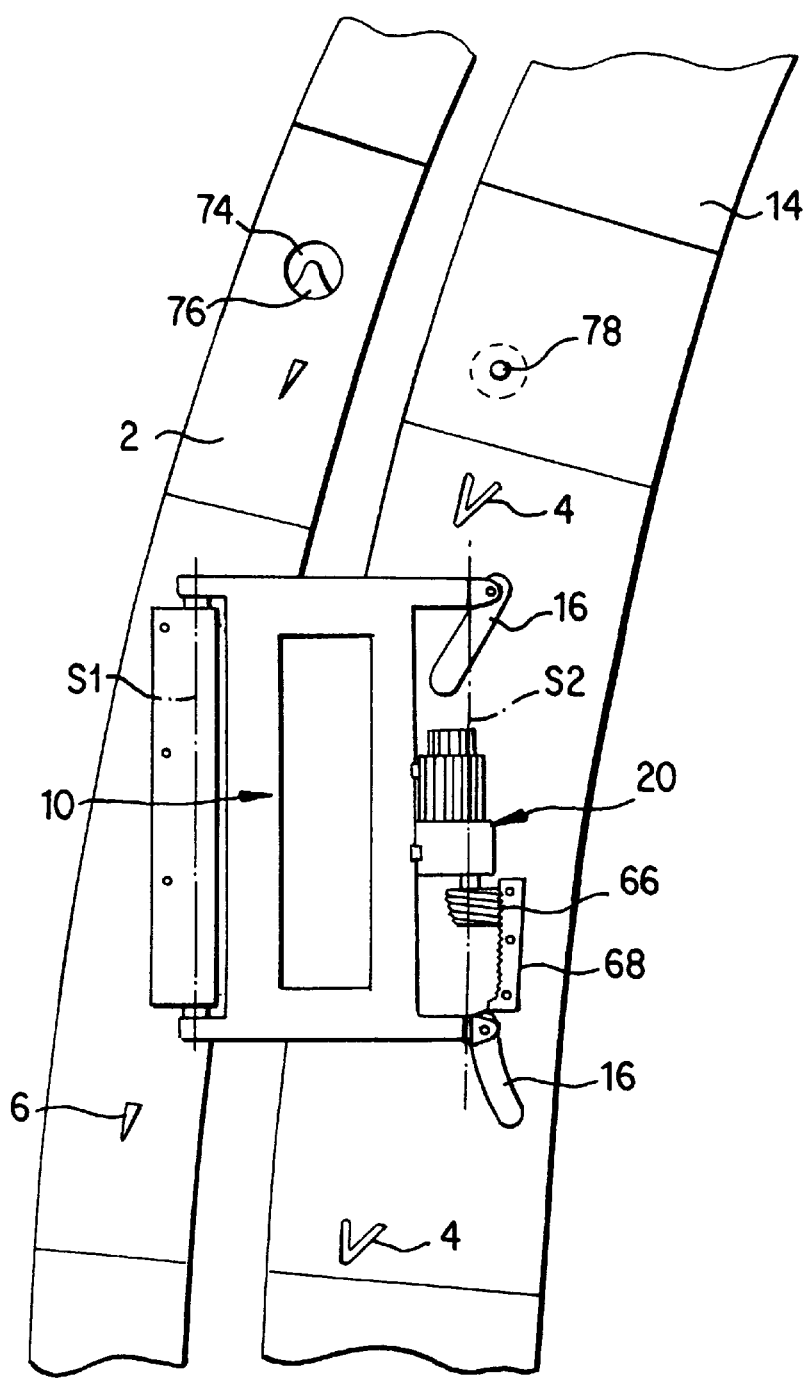
FIG. 1 shows an enlarged partial view of an upwardly pivotable door system for a passenger aircraft with a lift lock that is separate from the lifting and supporting device and the lifting and pivoting drive.
Figure 2:
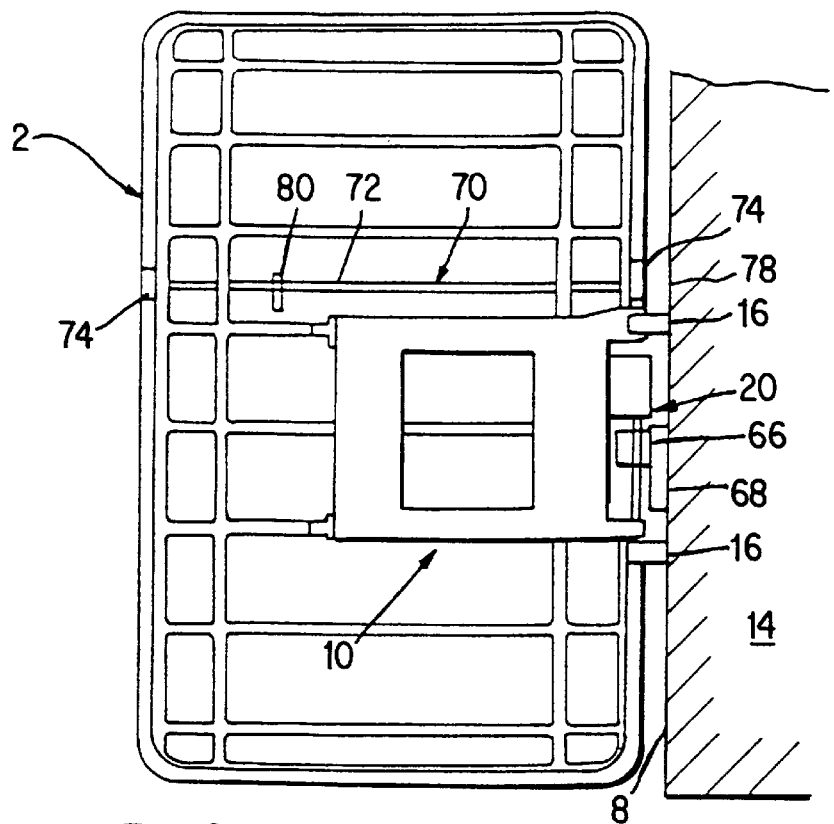
FIG. 2 is a rear view of the door system according to FIG. 1 in a partially open state.
Figure 3:
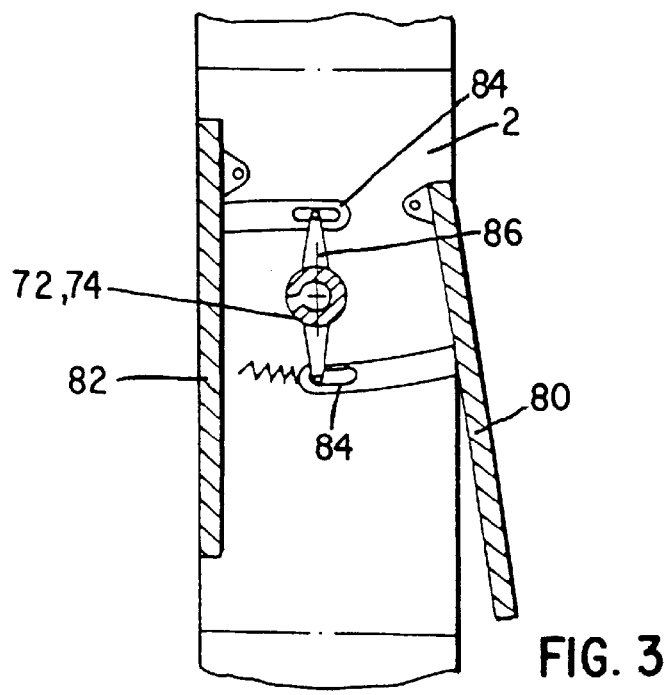
FIG. 3 shows the actuating mechanism of the lift lock.

The upwardly pivotable door system shown in FIGS. 1–3 for a passenger aircraft contains as the principal component a pivoting and supporting device 10 that supports door panel 2 so that it can pivot around rotational axes S1 and S2, as well as a lifting device 16 that acts between device 10 and aircraft structure 14, by which device the door panel is guided upward out of the completely closed position along a curved lifting movement path, and as a result is moved out of shapewise engagement with counterbearing 6 that is integral with the door panel with receiving elements 4 fastened to door frame 14, so that it can be moved into the completely open position at the end of the opening travel, initially outward out of door opening 8 and then essentially parallel to the outside contour of the fuselage, with a common lifting and pivoting drive 20 being provided between the lifting and supporting device that is reversible at the end of the opening travel.

In addition, the door system described here has a door-locking system 70 that is independent of supporting and lifting device 10, 16 as well as lifting and pivoting drive 20, by which locking system door panel 2 is located directly at door frame 14 in the completely closed position. The door-locking system 70 is operated by a manual lever in the manner described further below and contains a locking shaft 72 that is rotatably mounted at the level of lever actuation on door panel 2 and extends transversely over the entire width of the door panel, with locking elements 74 fastened on both sides, each to one end of the shaft, in the vicinity of the door panel side edge, said elements 74 being provided with a recess 76 to receive a matching locking pin 78 (FIG. 1) integral with the door frame.

Figure 1A:
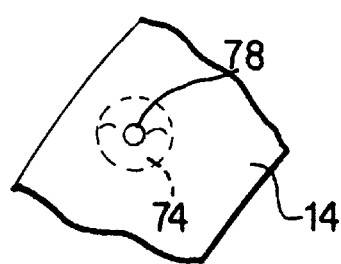
FIG. 1A is a detail view showing the lift lock in a locking position.

In the completely closed position of the door, locking pins 78 are pushed into recess 76 and locking elements 74 by means of locking shaft 72, and are then turned into the locking position shown by the dashed lines in FIG. 1A, in which they grip beneath locking pins 78 and thus secure door panel 2 to door frame 14 so that it cannot be lifted.

If on the other hand locking shaft 72 is rotated out of the locking position, locking elements 74 enter the release position shown by the solid lines in FIG. 1, in which they can move freely upward without being blocked by locking pin 78, so that door panel 2 can initially be raised by drive 20 out of the completely closed position and then can be pivoted open.

The actuation of door panel lock 70 consists of a lever 80 and 82 located on the inside of the door panel and on the outside of the door panel (FIG. 3). Manual levers 80 and 82 are each connected by a dead travel connection (elongate hole 84) to a two-armed rocker lever 86 fastened to locking shaft 72. If one of handles 80 or 82 is pulled, locking shaft 72 pivots into the release position. As a result of the mechanical decoupling of the two manual levers 80 and 82, when one of the manual levers is pulled, the other, nonoperated, lever remains in the resting position.

Figure 4:
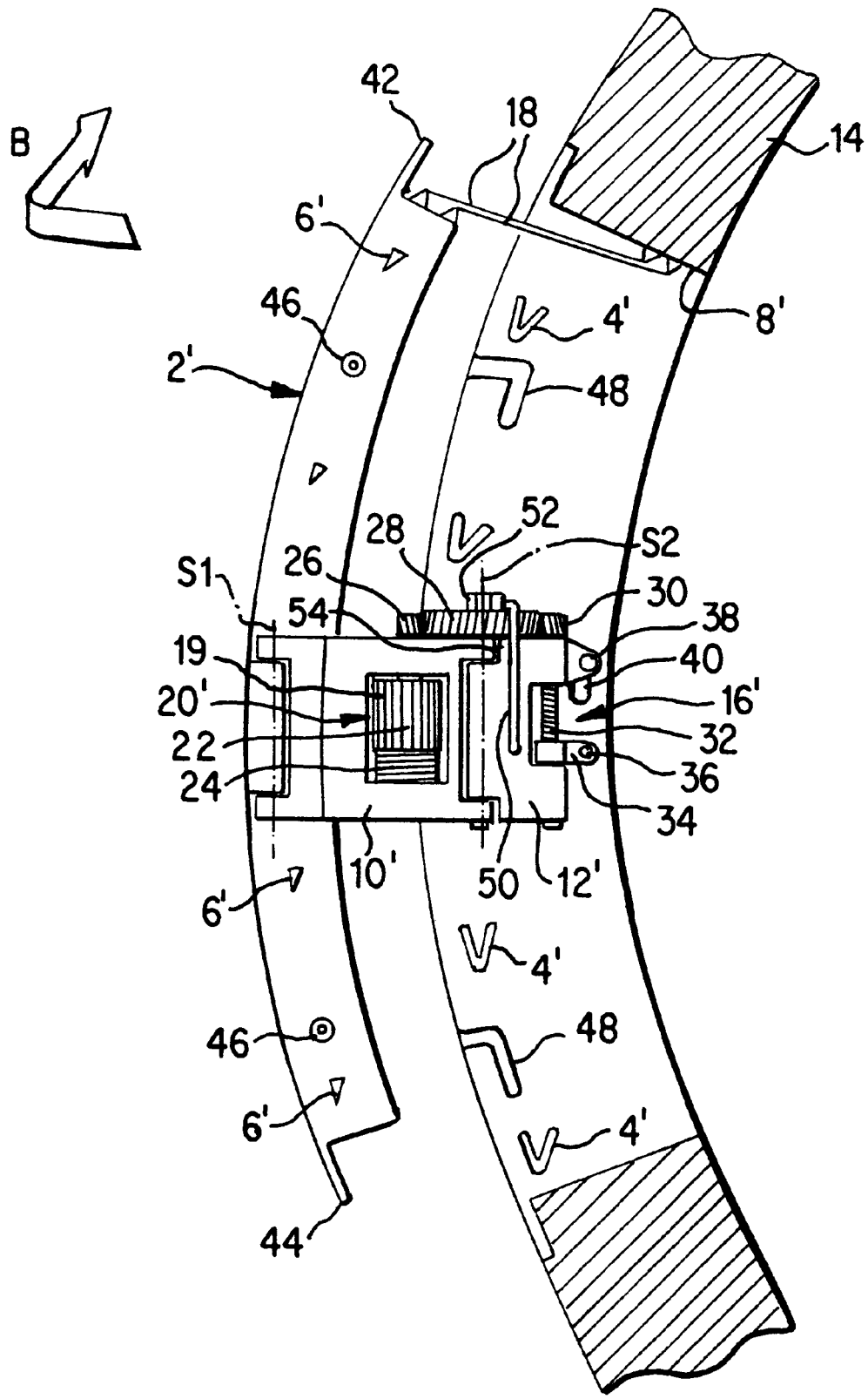
FIG. 4 is a view similar to FIG. 1, showing an upwardly pivotable door system with another embodiment of the lifting and supporting device and the lifting and pivoting device, shown with the door open.
Figure 5:
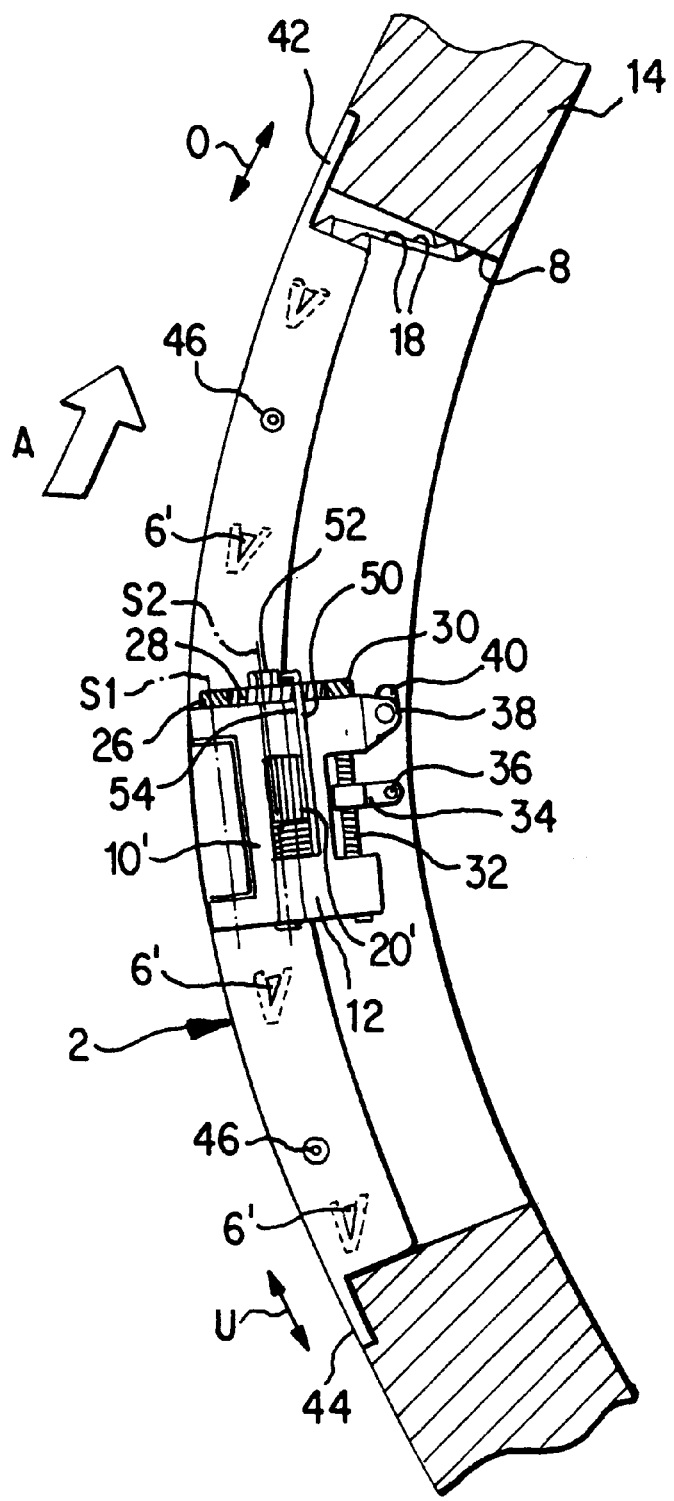
FIG. 5 is a view of the FIG. 4 door system, shown in the closed condition.

FIGS. 4 and 5 illustrate another preferred embodiment of a door system of the so-called "plug" type, in other words door panel 2' in the fully closed position in FIG. 2 is lowered into shapewise engagement between receiving elements 4' integral with the door frame and counterbearings 6' mounted on the edge of the door panel, and is lifted for opening along a lifting movement path that curves to match the outside contour of the aircraft, out of shapewise engagement with receiving elements 4' relative to door opening 8' (arrow direction A—FIG. 5) before it is pivoted outward out of door opening 8' and then moves essentially parallel to the outside of the fuselage into the fully open position (arrow direction B in FIG. 4).

The pivoting and supporting device required for this purpose comprises a supporting arm 10', on which door panel 2' is movably suspended to rotate around a pivot axis S1, as well as a supporting element 12 that is connected with supporting arm 10' so that it is pivotably movable around an axis S2 parallel to pivot axis S1, said element 12 being connected to door frame 14' by a lifting device represented as a whole by 16'. In movement phase B, door panel 2' is guided by two control links that operate between door panel 2' and door frame 14'.

For the lifting and pivoting function, a drive 20' is provided, with its housing 19' fastened to supporting arm 10', said drive consisting of an electric-motor main drive 22 and an emergency drive 24 that supports the latter or replaces it in the event of a malfunction, travels on the same axis as main drive 22, and is normally in "idle", Pinion 26 of drive 20' meshes with an intermediate gear 28 that is freely rotatably mounted to rotate around pivot axis S2, said gear 28 meshing with drive pinion 30 of a drive spindle 32 mounted rotatably on supporting element 12', with spindle lock 34 of said spindle 32 being fastened to door frame 14' by a pivot 36. At the upper end, supporting element 12' is displaceably guided by a roller bearing 38 in a guide slot 40 on door frame 40. The geometry of the lifting kinematics that consists of drive spindle 32, pivot 36 and roller bearing 38 and guide slot 40 is chosen so that door panel 2', together with supporting devices 10', 12', when drive spindle 32 rotates, travels along a lifting movement path A that is curved to match the outside contour of the aircraft, as shown in FIG. 5 by the differently inclined lifting directions O and U of upper and lower door panel edges 42 and 44 respectively, with pivot axes S1 and S2, which tilt as the door panel tilts, aligned vertically at the end of the opening travel relative to a reference system integral with the aircraft.

If drive 20' is activated when door panel 2' is in the fully closed position (FIG. 2), spindle 32 is driven and as a result supporting devices 10', 12' and door panel 2' are raised in door opening 8'. The reaction moment of drive 20' is supported by housing 19 on supporting arm 10', but pivoting of door panel 2' into the open position is initially prevented by the shapewise engagement of counterbearings 6' in receiving elements 4' as well as possibly additionally by rollers 46 integral with the door panel which travel in corresponding guide rails 48 at door opening 8' until the end of the opening travel, limited by a stop, is reached, firstly by rollers 46 and guide rails 48 and secondly by spindle lock 34 that strikes supporting element 12' In this position, in which spindle 32 cannot be rotated any further, counterbearings 6' are lifted out of shapewise engagement with receiving elements 4' and guide rollers 46 can move freely outward out of guide rails 48. Since intermediate gear 28 is held in a nonrotatable fashion by drive pinion 30, when drive 20' is activated once again, pinion 26 travels in the manner of a planet gear around fixed intermediate gear 28, so that supporting arm 10' is extended around pivot axis S2 and as a result door panel 2' is initially pivoted outward out of door opening 8 (FIG. 1) and then essentially parallel to the outside contour of the aircraft into the completely open position.

To close the door, drive 20' is activated in the opposite direction of rotation so that the described door functions take place in reverse order. During the pivoting phase of door panel 2', assurance must be provided that intermediate gear 28 and drive spindle 32 remain locked so that they do not rotate until door panel 2' has pivoted inward completely into door opening 8'. For this purpose, a spring-loaded latching lever 50 is provided on supporting element 12', said lever engaging a notch 52 in intermediate gear 28 as long as door panel 2' is in pivoting phase B. When door panel 2' pivots inward into door opening 8', latching lever 50 is pushed back against the force of the spring by a stop 54 of supporting arm 10' out of notch 52 so that intermediate gear 28 and drive spindle 32 become freely rotatable and door panel 2' is lowered once again into the completely closed position (FIG. 5) under the influence of drive 20' that continues to operate.

As long as drive 20' is switched off, door panel 2' remains locked in the closed position shown in FIG. 1, so that the screw connection between drive spindle 32 and spindle lock 34 is made to be self-locking. As a result, assurance is provided that door panel 2' cannot migrate by itself out of the fully lowered lifting position as a result of vibration or impact effects and as a result come loose from a shapewise engagement with receiving elements 4 that are integral with the fuselage.

A separate door locking system, similar to the door locking system described above with respect to FIGS. 1–3, is preferably also applied to the embodiment of FIGS. 4 and 5. This door locking system is not further illustrated in FIGS. 4 and 5 since the cooperating features for the locking system are the same as for the embodiment of FIGS. 1–3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Door system for a passenger aircraft, having a supporting device that supports a door panel in a pivotably movable fashion on a door frame and with a lifting device connected thereto which carries the door panel on a curved lifting movement path into a complete closed position at the end of an inward pivoting movement, transversely to the pivoting direction, with a shapewise engagement with receiving elements integral with the door frame, and moves outward in an opposite lifting direction out of shapewise engagement at the beginning of the opening process, and with a lifting and pivoting drive that is jointly associated with the lifting and supporting device and is reversed at the end of the opening travel between the lifting and supporting device, wherein a lift lock is provided that is actuated in the completely closed position of door panel and locks the panel to door frame independently of the lifting and supporting devices and the lifting and pivoting drive.

2. Door system according to claim 1, wherein the door locking system comprises a locking shaft which is rotatably arranged on the door panel and extends in a transverse manner at the level of the lock operating device essentially along the whole door panel width and has locking elements which are in each case fastened on both sides on the shaft end and, in the operating position of the door locking system, are rotated in the non-lifting engagement with corresponding door-frame fixed counterelements.

3. Door system according to claim 1, wherein at least one manual lever is provided for operating the locking system, which manual lever is accessible from the interior side of the door.

4. Door system according to claim 2, wherein at least one manual lever is provided for operating the locking system, which manual lever is accessible from the interior side of the door.

5. Door system according to claim 2, wherein a manual lever system is provided for operating the locking system, which manual lever system includes an inside lever which is accessible from the interior side of the door panel and an outside lever which is accessible from the exterior side of the door panel, which manual levers, in a mutually mechanically uncoupled manner, are connected to the locking shaft.

6. Door system according to claim 4, wherein a manual lever system is provided for operating the locking system, which manual lever system includes an inside lever which is accessible from the interior side of the door panel and an outside lever which is accessible from the exterior side of the door panel, which manual levers, in a mutually mechanically uncoupled manner, are connected to the locking shaft.

* * * * *